(No Model.)
R. A. JOHNSON.
Cultivator.
No. 239,798.  Patented April 5, 1881.
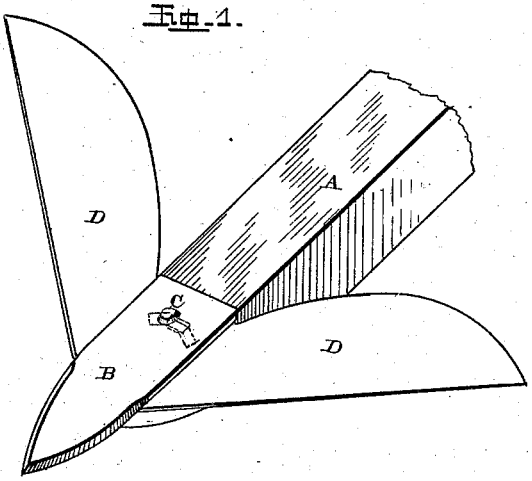
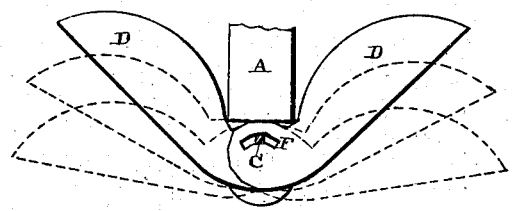
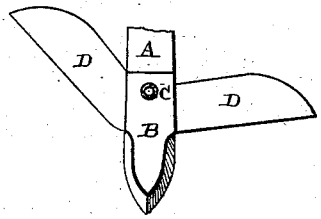
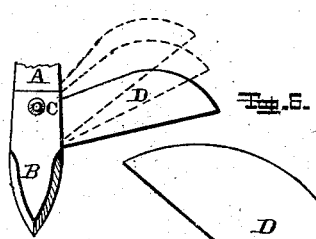
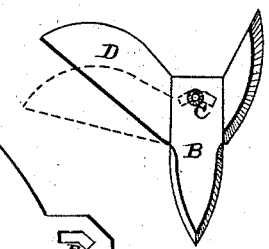
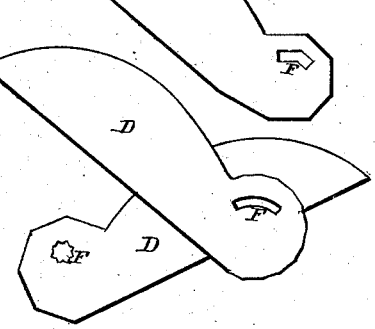
Witnesses.
Wm W. Mortimer
A. C. Kirkadden
Inventor.
R. A. Johnson,
per
F. A. Lehmann,
Atty.

UNITED STATES PATENT OFFICE.

RICHARD A. JOHNSON, OF NEWNAN, GEORGIA.

CULTIVATOR.

SPECIFICATION forming part of Letters Patent No. 239,798, dated April 5, 1881.

Application filed February 12, 1881. (No model.)

To all whom it may concern:

Be it known that I, R. A. JOHNSON, of Newnan, in the county of Coweta and State of Georgia, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators, and is intended as an improvement upon the patents granted to me June 29 and September 14, 1880; and it consists in the use of two slotted wings in connection with a shovel-cultivator of any desired construction, the wings having their slots so shaped that they can be adjusted vertically, so as to bring their two edges down to the surface of the earth, and thus act as a scraper, or bring only one down while the other remains at a suitable angle, as will be more fully described hereinafter.

The object of my invention is to so shape the slots in each one of the wings that it can be adjusted independently of the other wing, and thus adapted to perform different kinds of work.

Figure 1 is a perspective of my invention complete. Fig. 2 is a front view of the two wings alone, attached to the plow-standard. Fig. 3 is a similar view, showing one wing arranged to act as a scraper, while the other turns up the soil. Fig. 4 shows a single wing attached to the standard, and used in connection with the cultivator. Fig. 5 shows a wing used in connection with a guard for protecting the young plants from the dirt. Fig. 6 shows the different forms of slots or holes which may be made through the wings for the purpose of adjusting them into different positions.

A represents an ordinary plow stock or standard; B, the cultivator, attached to its lower end by means of the bolt C. This bolt C has square shoulders made just inside of its head, and passes through the cultivator, the two wings D, and the plow-standard, and receives a suitable clamping-nut upon its rear end. Each one of the wings D has a slot or opening, F, made through it, where the clamping-bolt passes through, and this opening may consist simply of a curved slot without any angles, or a curved slot having a number of pairs of angles which catch upon opposite sides of the square shoulders of the clamping-bolt; or the opening may consist simply of two holes which are punched through it at the same point, but at angles to each other, so as to form a sort of a star, as shown in Fig. 6. Any one of these three forms of openings will answer the same purpose, all of them being intended to allow the wing to be adjusted into any desired position, as shown by dotted lines in the different figures, whereby the wing is adapted to be used either as a scraper or simply for turning up the earth as the cultivator is moved along. Whenever a curved slot without any angles, or an angular slot or a double punched hole, is used, corresponding angles for every different adjustment must be made upon the top of the wing, and these angles or corners will catch against the under side of the shoulder G, which is made upon the standard, and thus prevent the wing from changing the position into which it has been adjusted. These wings may be used in pairs, where both wings will have the same adjustment, or one wing may be turned up, so as to turn over the earth, while the other one acts as a scraper; or but a single wing may be used, as the circumstances of the case may require.

In my patent of September 14, 1880, numbered 232,133, is shown a slot with simply two angles formed in it, and used in connection with a guard for protecting the young plants; but this cultivator admits of but a limited use in comparison with my present invention.

It is absolutely necessary, in order to produce a machine which is adapted for general use upon a farm, to have two wings which are adjustable independently of each other, so that different kinds of crops may be cultivated equally as well. At different stages of the growing crop different-sized wings are necessary, and in order to obtain these different sizes from the same wing it is absolutely necessary that each wing should have an independent adjustment of its own, and this adjustment can only be obtained by means of the slots or double punched holes, as shown, in connection with the shoulders or angles upon the top edge of the wing, for the purpose of catching against the shoulder on the lower end of the standard.

I am well aware that slotted wings capable of several adjustments have heretofore been used upon the sides of the standards or landsides, and this I disclaim. My invention is limited to the two wings having a series of different angles on their upper and inner ends, so as to catch under the shoulder on the front side of the standard, and held in place by a bolt which passes through an angular or curved slot.

Having thus described my invention, I claim—

In a cultivator, the combination of the standard A, the cultivator B, the clamping-bolt C, and the two wings, which have slots or openings made through them for the clamping-bolt to pass through, and angles upon the top edge of the wing to catch against the under side of the shoulder on the standard, the parts being combined and arranged to operate substantially as shown and described.

In testimony whereof I affix my signature in presence of two witnesses.

RICHARD A. JOHNSON.

Witnesses:
WM. H. KERN,
A. C. KISKADDEN.